United States Patent
Huang et al.

(10) Patent No.: US 8,305,057 B2
(45) Date of Patent: Nov. 6, 2012

(54) POWER SUPPLY AND OVER VOLTAGE PROTECTION APPARATUS AND OVER VOLTAGE PROTECTION METHOD

(75) Inventors: Nung-Te Huang, Taipei (TW); Chih-Wan Hsu, Taipei (TW); Kai-Fu Chen, Taipei (TW); Yi-Wei Chiu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 625 days.

(21) Appl. No.: 12/493,251

(22) Filed: Jun. 29, 2009

(65) Prior Publication Data
US 2010/0013450 A1 Jan. 21, 2010

(30) Foreign Application Priority Data
Jul. 17, 2008 (TW) .............................. 97127213 A (51) Int. Cl.
*G05F 1/00* (2006.01)
(52) U.S. Cl. ....................................... 323/272
(58) Field of Classification Search .......... 323/266–272; 327/540
See application file for complete search history.

(56) References Cited

U.S. PATENT DOCUMENTS

| | | | |
|---|---|---|---|
| 6,031,362 A * | 2/2000 | Bradley | 323/269 |
| 6,249,411 B1 | 6/2001 | Hemena et al. | |
| 6,873,191 B2 | 3/2005 | Dequina et al. | |
| 6,946,904 B1 | 9/2005 | Varma et al. | |
| 7,598,715 B1 * | 10/2009 | Hariman et al. | 323/271 |
| 7,746,044 B2 * | 6/2010 | Chen et al. | 323/266 |
| 7,764,111 B2 * | 7/2010 | Chiu et al. | 327/540 |

FOREIGN PATENT DOCUMENTS

| | | |
|---|---|---|
| CN | 2277591 | 4/1998 |
| CN | 1388618 | 1/2003 |
| CN | 1497829 | 5/2004 |
| TW | 200406968 | 5/2004 |
| TW | 200740067 | 10/2007 |

OTHER PUBLICATIONS

"First Office Action of China Counterpart Application", issued on May 20, 2011, p. 1-6, in which the listed references were cited.

* cited by examiner

*Primary Examiner* — Jue Zhang
(74) *Attorney, Agent, or Firm* — Jianq Chyun IP Office (57) ABSTRACT

A power supply, an over voltage protection (OVP) apparatus, and an OVP method are provided. The present invention employs the OVP apparatus for monitoring a core power. When a voltage level of the core power is higher than a reference voltage, the OVP apparatus disables a power supply unit. As such, the present invention is adapted for avoiding damage to a capacitor of a conversion unit or load caused by abnormal boost of the voltage level of the core power.

18 Claims, 9 Drawing Sheets

POWER SUPPLY AND OVER VOLTAGE PROTECTION APPARATUS AND OVER VOLTAGE PROTECTION METHOD

CROSS-REFERENCE TO RELATED APPLICATION

This application claims the priority benefit of Taiwan application serial no. 97127213, filed on Jul. 17, 2008. The entirety of the above-mentioned patent application is hereby incorporated by reference herein and made a part of specification.

BACKGROUND OF THE INVENTION

1. Field of the Invention

The present invention generally relates to an over voltage protection (OVP) apparatus and an OVP method, and more particularly, to an OVP apparatus adapted for a power supply, and an OVP method.

2. Description of Related Art

In designing a typical consumer electronic product, in order to avoid damage to the electronic product caused by prospective incorrect input of power supply, an OVP apparatus is often employed for providing further protection to the electronic product.

Figure 1:
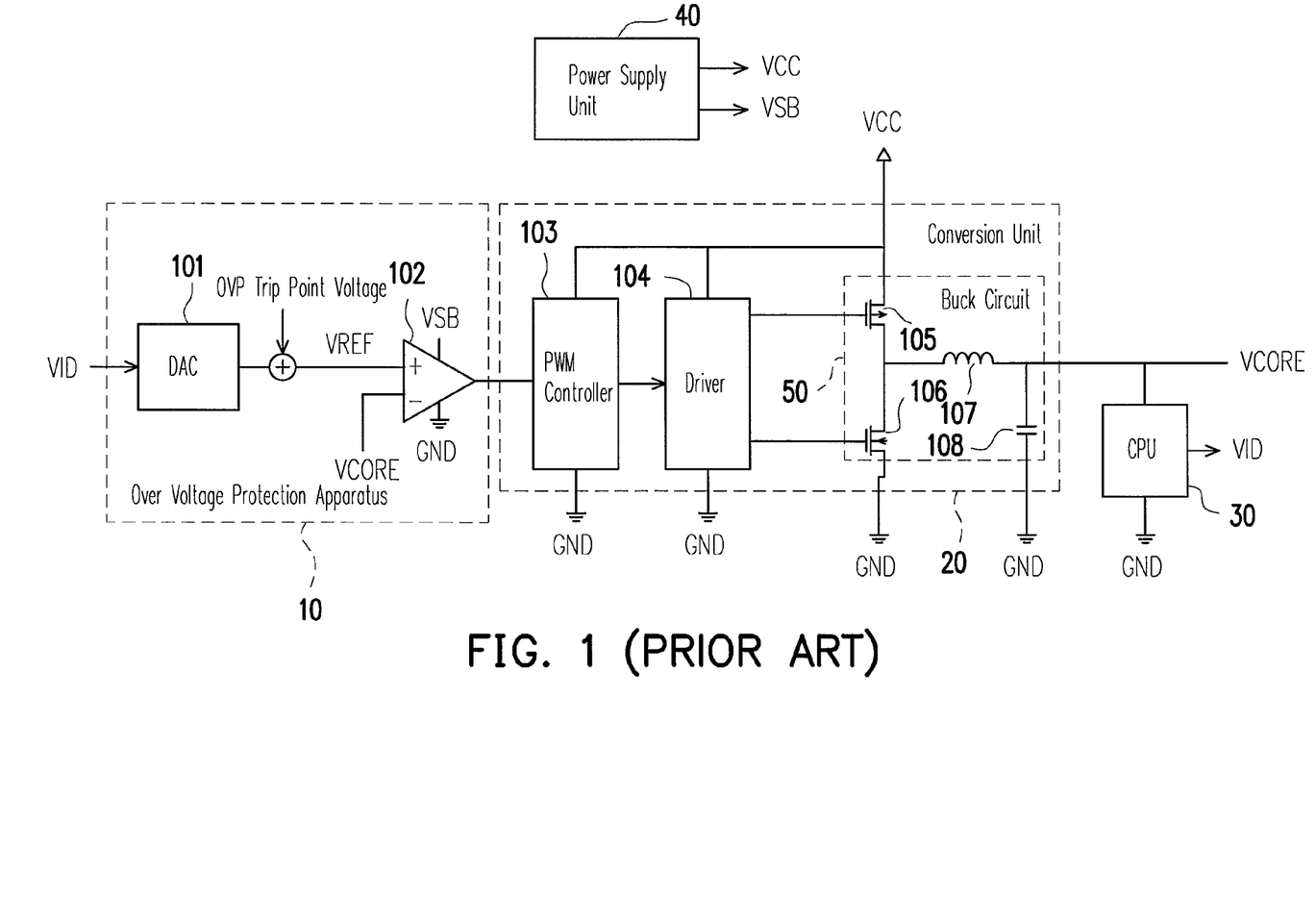
FIG. 1 illustrates an architectural diagram of a conventional over voltage protection (OVP) circuit used for protecting a load.

For example, FIG. 1 illustrates an architectural diagram of a conventional OVP circuit used for protecting a load. Referring to FIG. 1, the architecture includes an OVP apparatus 10, a conversion unit 20, a central processing unit (CPU) 30, and a power supply unit 40. The OVP apparatus 10 includes a digital-to-analog converter (DAC) 101 and a comparator 102. The conversion unit 20 includes a pulse width modulation (PWM) controller 103, a driver 104, and a buck circuit 50. The buck circuit 50 further includes an upper power transistor 105, a lower power transistor 106, an inductance 107, and a capacitor 108. The power supply unit 40 is adapted for providing a system power VCC and a standby power VSB. When the power supply unit 40 is disabled, the standby power VSB is still provided while the system power VCC stops being provided.

Typically, the operation voltage of the CPU 30 is about 1.2V to 1.4V, while the system power VCC provided by the power supply unit 40 is about 12V. Therefore, the system power VCC should be reduced to a core power VCORE (about 1.2V) by the conversion unit 20, such that the system power VCC can be provided to the CPU 30. The conversion unit is a buck converter which is well known in conventional technologies and thus is not further iterated herein. However, it should be noted that when the upper power transistor 105 suffers a sudden failure which causes a short circuit of the upper power transistor 105, the system power VCC (about 12V) would be directly outputted to the inductance 107, and sequentially to the capacitor 108 and the CPU 30. The capacitor 108 can typically endure a voltage less than or equal to 4V. Therefore, once the short circuit of the upper power transistor 105 occurs, not only the capacitor 108 is destroyed, but also the CPU 30 is damaged.

Further, in order to provide an over voltage protection, the core power VCORE is fed back to the comparator 102 of the OVP apparatus 110. The DAC 101 converts a digital signal VID provided by the CPU 30 into an analog signal. The analog signal is adjusted by an OVP trip point voltage to generate a reference voltage VREF (e.g., 2V). The reference voltage is then inputted to the comparator 102 via another input end of the comparator 102. The comparator 102 is adapted for comparing the reference voltage VREF with the core power VCORE. When the upper power transistor 105 suffers a short circuit failure and the core power VCORE becomes higher than the reference voltage VREF (i.e., 2V), the comparator 102 forces the lower power transistor 106 to be conducted via the PWM controller 103 and the driver 104. When the lower power transistor 106 is conducted, the voltage of the core power VCORE drops correspondingly, thus preventing damages caused by direct input of an over high voltage to the capacitor 108 and the CPU 30.

However, the above-discussed approach unfortunately raises an undesired serious issue. When the core power VCORE is higher than the reference voltage VREF (i.e., when the upper power transistor 105 suffers a short circuit failure), the conventional OVP apparatus 10 forces the lower power transistor 106 to be conducted. In this case, a short circuit occurs between the system power VCC and the ground GND. As such, the conducting path between the transistors 105 and 106 pulls down the voltage of the system power VCC. When the voltage of the system power VCC is lower than the operation voltage of the PWM controller 103 and the driver 104, the PWM controller 103 and the driver 104 cannot work as normal. Therefore, the lower power transistor 106 cannot remain conducted. The lower power transistor 106 thus goes back to the cutting-off status, which causes the voltage of the core power VCORE to be increased again. When the voltage of the core power VCORE becomes higher than the reference voltage VREF, the lower power transistor 106 then goes back to the conducting status, which causes the voltage of the core power VCORE to be dropped again. This process is repeated over and over, configuring an oscillation voltage. The oscillation voltage causes damages to the capacitor 108 and the CPU 30.

Figure 2:
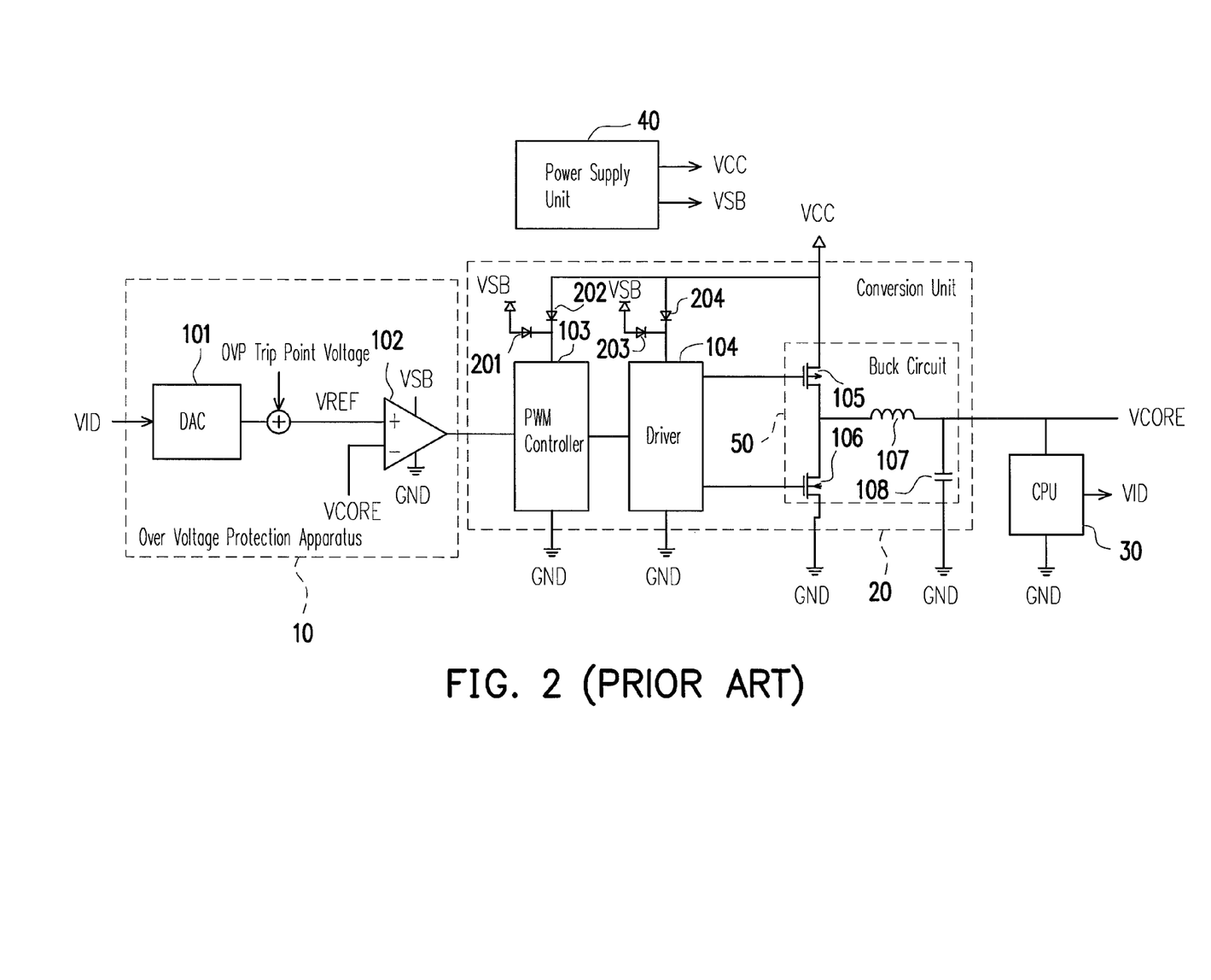
FIG. 2 illustrates an architectural diagram of another conventional OVP circuit used for protecting a load.

To resolve said issue, the conventional technology has been further proposed to provide a standby power VSB to the PWM controller 103 and the driver 104. FIG. 2 illustrates an architectural diagram of another conventional OVP circuit used for protecting a load. Referring to FIG. 2 in view of FIG. 1, the difference between the architecture of FIG. 2 and that of FIG. 1 lies in that FIG. 2 further includes additional diodes 201 to 204. When the upper power transistor 105 encounters a short circuit failure causing the core power VCORE to be higher than the reference voltage VREF (2V), the comparator 102 of the conventional OVP apparatus 10 forces the lower power transistor 106 to be conducted via the PWM 103 and the driver 104. When the lower power transistor 106 is conducted, the voltage of the core power VCORE drops correspondingly, thus preventing damages caused by direct input of an over high voltage to the capacitor 108 and the CPU 30. Forcing the lower power transistor 106 to be conducted may cause the short circuit between the system power VCC and the ground GND. As such, the conducting path configured between the transistors 105 and 106 pulls down the voltage of the system power VCC. Meanwhile, the standby power VSB provides operation power via the diodes 201 and 203 to the PWM controller 103 and the driver 104, so that the lower power transistor 106 remains conducted, thus avoiding the overly high voltage of the core power VCORE.

However, the above-discussed approach unfortunately raises another undesired serious issue. When the lower power transistor 106 remains conducted, in case the system power VCC stops supplying power, the power previously stored in the capacitor 108 is discharged to form a discharging current. The discharging current flows via the inductance 107 to the lower power transistor 106. This discharging current flowing though an equivalent series resistance (ESR) of the capacitor 108 produces a negative voltage. Generally, the CPU can tolerate a negative voltage no more than −300 mV. Unfortunately, the negative voltage produced by the discharging current often exceeds the tolerance of the CPU 30 for the negative voltage, and thus may cause damages to the CPU 30.

Accordingly, it is very much desirable for the main board manufacturers to find proper solutions to the above-discussed problems.

SUMMARY OF THE INVENTION

Accordingly, the present invention is directed to a power supply protecting a load from being damaged by an over voltage through employing an OVP apparatus for protecting a load from being damaged by an over voltage.

The present invention is further directed to an OVP apparatus. The OVP apparatus determines whether to provide a system power to a conversion unit by comparing a reference voltage with a core power, so as to avoid a load to be damaged by an over voltage or a negative voltage applied thereupon.

The present invention is further directed to an OVP method, adapted for avoiding damages to a load or a capacitor caused by an over voltage occurring at a conversion unit.

The present invention provides a power supply. The power supply includes a power supply unit, a conversion unit, and an OVP apparatus. The power supply unit is adapted for providing powers of different voltage levels. The powers include a standby power and a system power. When the power supply unit is disabled, the power supply unit keeps supplying the standby power but stops supplying the system power. The conversion unit is adapted for converting the system power outputted from the power supply unit into a core power for providing the same to a load. The OVP apparatus is coupled to the power supply unit for receiving the standby power. The OVP apparatus is further coupled to the conversion unit for monitoring a voltage level of the core power. When the voltage level of the core power is higher than a reference voltage, the OVP apparatus disables the power supply unit.

From another perspective, the present invention further provides an OVP apparatus for monitoring whether the voltage level of the core power outputted from the conversion unit is higher than the reference voltage. The OVP apparatus includes a reference voltage generator and a comparison unit. The reference voltage generator is adapted for generating the reference voltage according to the standby power. The comparison unit is adapted for receiving the reference voltage and the core power, and comparing the reference voltage with the core power. The OVP apparatus determines whether to provide the system power to the conversion unit according to a comparison result of comparing the reference voltage with the core power.

From still another perspective, the present invention provides an OVP method for avoiding an over voltage occurring at the conversion unit. The OVP method includes steps of: providing a reference voltage; comparing a voltage level of the core power outputted from the comparison unit with the reference voltage; and determining whether to provide the system power to the conversion unit according to the comparison result.

The present invention employs an OVP apparatus for monitoring the core power. When the voltage level of the core power exceeds a reference voltage, the OVP apparatus disables the power supply unit. As such, the present invention is adapted for avoiding damages caused by unusual boost of voltage level of the core power to the capacitor or the load of the conversion unit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In discussing the following embodiments, when an element is depicted as being connected to or coupled to another, it is indicated that the element can be either directly connected to or coupled to the another, or indirectly connected to or coupled to the another. When the element is depicted as being indirectly connected to or coupled to another, it means there is at least one other element connected or coupled therebetween. Correspondingly, when an element is depicted as being directly connected to or coupled to another, it means there is no other element connected or coupled therebetween.

Figure 3:
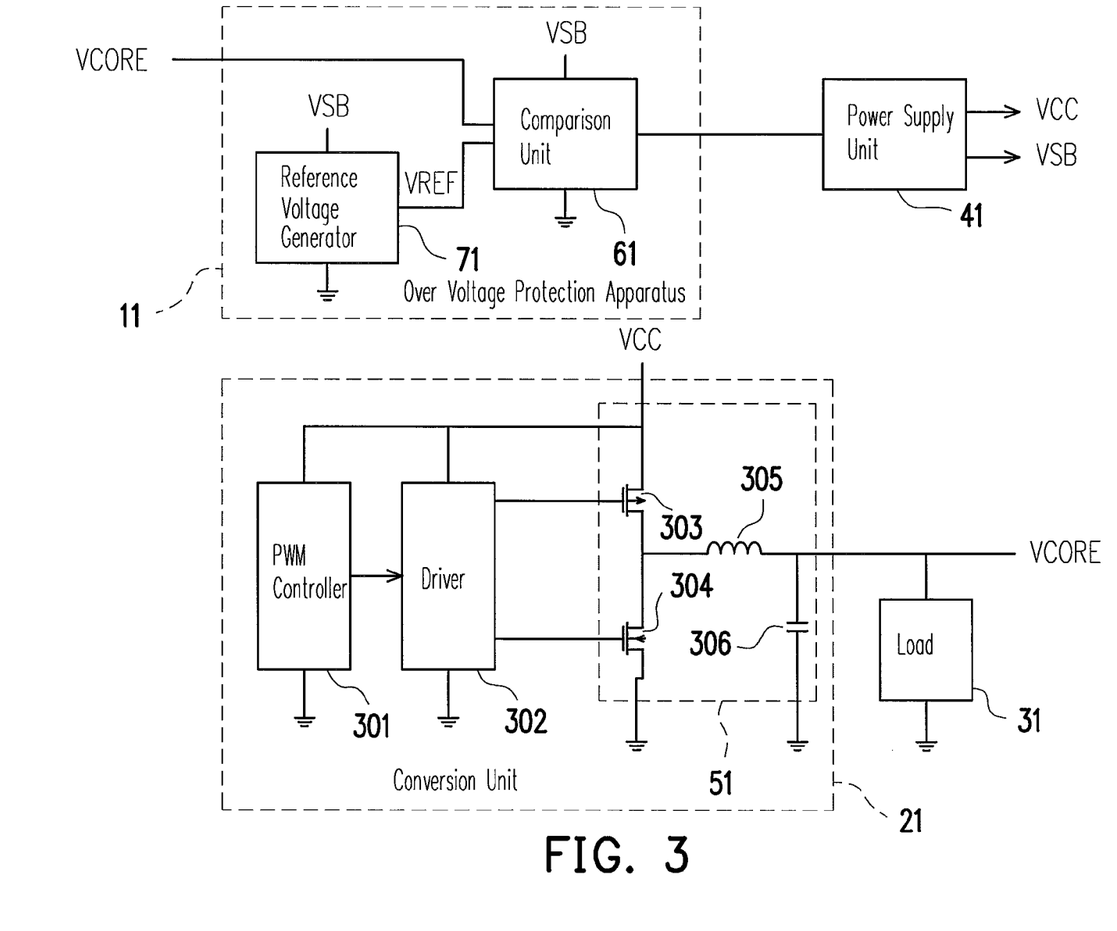
FIG. 3 is an architectural diagram of a power supply according to an embodiment of the present invention.

FIG. 3 is an architectural diagram of a power supply according to an embodiment of the present invention. Referring to FIG. 3, the power supply includes a power supply unit 41, an over voltage protection (OVP) apparatus 11, and a conversion unit 21. The power supply unit 41 is adapted for providing powers of different voltage levels. In the current embodiment, the power supply unit 41 is exemplified as supplying a standby power VSB (e.g., 5V) and a system power VCC (e.g., 12V). When the power supply unit 41 is disabled, the power supply unit 41 keeps supplying the standby power VSB but stops supplying the system power VCC.

The conversion unit 21 is adapted for converting the system power VCC outputted from the power supply unit 41 into a core power VCORE for providing the same to a load 31. In the current embodiment, the load 31 is exemplified as a CPU. Those having ordinary skill in the art should be aware that the CPU exemplified herein is given as an example without further restricting the scope sought to be protected by the instant application. In other embodiments, the load 31 can be other elements, such as a south bridge chip, a north bridge chip, or the like. The conversion unit 21 includes a pulse width modulation (PWM) controller 301, a driver 302, and a buck circuit 51. The buck circuit 51 includes an upper power transistor (e.g., a PMOS transistor), a lower power transistor (e.g., an NMOS transistor), an inductance 305, and a capacitor 306.

The buck circuit 51 is adapted for converting the system power VCC into a core power VCORE for providing the same to the load 31 for use. In the current embodiment, the voltage of the core power VCORE is 1.2V, for example. In other embodiments, the core power VCORE may have other voltages in accordance with the load 31. When the load 31 requires a voltage higher than the system voltage VCC, a boost circuit can be employed instead of the buck circuit 51 for providing the core power VCORE to the load 31. The driver 302 is adapted for driving the buck circuit 51. The PWM controller 301 is adapted for modulating a pulse width of a PWM signal according to the core power VCORE, and outputs the PWM signal to the driver 302, so as to control the voltage level of the core power VCORE outputted from the buck circuit 51 via the driver 302. Those skilled in the art should be aware of any technical approaches to enable the PWM controller 301, e.g., use a pulse frequency modulation (PFM) technique or other techniques to enable the controller 301.

More attention ought to be paid to the OVP apparatus 11. The OVP apparatus 11 includes a comparison unit 61 and a reference voltage generator 71. When a short circuit failure occurs at the upper power transistor 303 of the buck circuit 51, the system power VCC pulls up the voltage of the core power VCORE via the inductance 305. When the voltage of the core power VCORE is pulled from 1.2V as original up to a voltage limit that the load 31 is no longer able to endure (e.g., 2V), the load 31 may be damaged. Further, the capacitor 306 usually can endure a relative low voltage (e.g., lower than 4V). As such, the short circuit failure of the upper power transistor 303 often causes explosion of the capacitor 306. In order to resolve this problem, the OVP apparatus 11 is employed to monitor the core power VCORE via the comparison unit 61.

Further, the comparison unit 61 has two input terminals, respectively receiving the core power VCORE and a reference voltage VREF provided by the reference voltage generator 71. The OVP apparatus 11 determines whether to disable the power supply unit 41 (i.e., controlling the power supply unit 41 to provide the system power VCC or not) according to a comparison result of the comparison unit 61. In the current embodiment, the reference voltage VREF is, for example, 2V, while in other embodiments the level of the reference voltage VREF is varied in accordance with practical requirements. When the core power VCORE is lower than the reference voltage VREF, the comparison result of the comparison unit 61 comparing the core power VCORE with the reference voltage VREF is at a logic low level. Therefore, the power supply unit 41 keeps providing the system power VCC to the conversion unit 21. Otherwise, when the core power VCORE is higher than the reference voltage VREF, the comparison result of the comparison unit 61 is at a logic high level. Therefore, the power supply unit 41 does not provide the system power VCC to the conversion unit 21 anymore. Because the power supply unit 41 stops providing the system power VCC to the conversion unit 21, the conversion unit 21 cannot convert the system power VCC into the core power VCORE, thus avoiding the damage caused by an over voltage to the load 31. Further, the current embodiment does not force the lower power transistor 304 to be conducted by the OVP apparatus 11, and therefore, when the system power VCC is disabled, a negative voltage which may damage the load 31 is not generated. In other words, the spirit of the present invention would have been well fulfilled, if the OVP apparatus 11 is used for determining whether the power supply unit 11 provides the system power VCC to the conversion unit 21. The OVP apparatus 11 is going to be further illustrated in more detail below.

Figure 4:
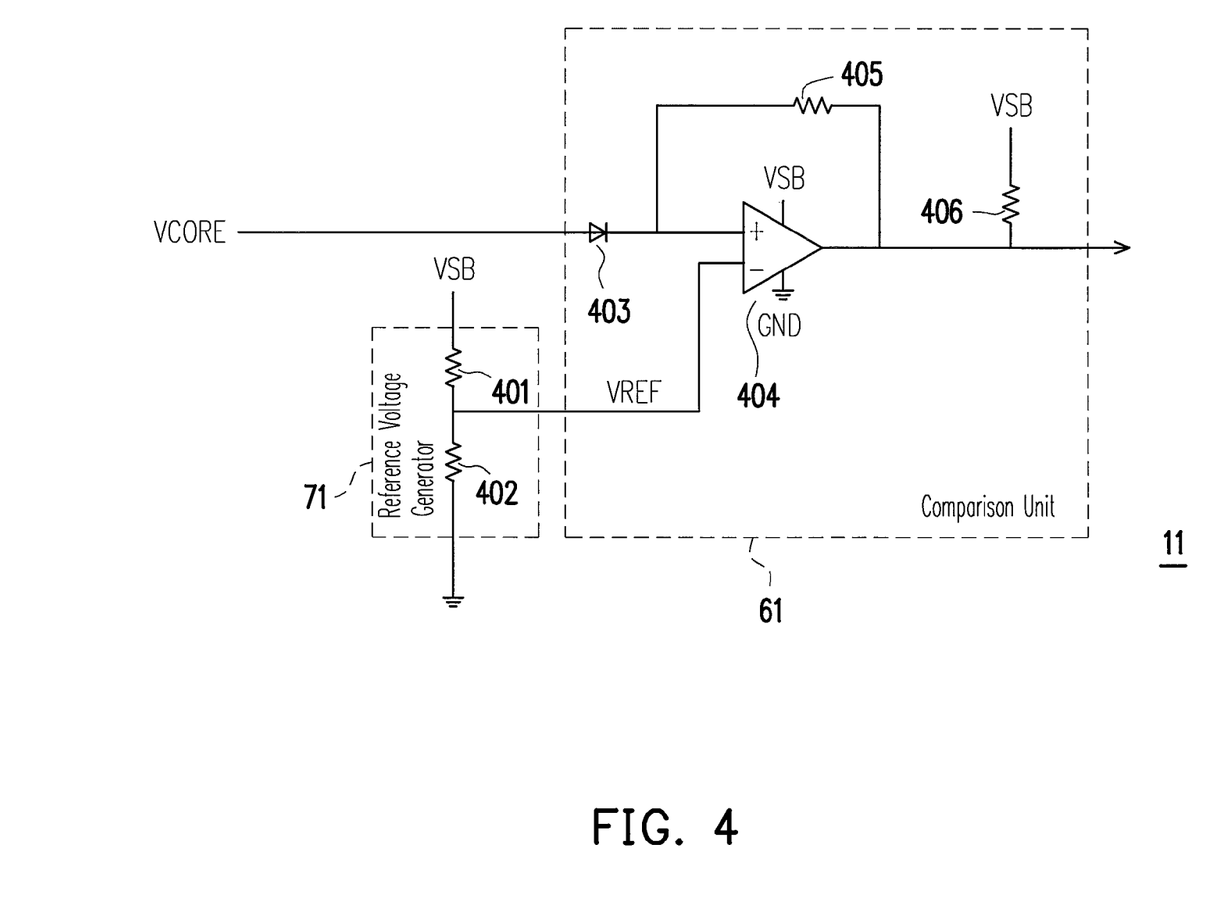
FIG. 4 is an architectural diagram of an OVP apparatus according to an embodiment of the present invention.

FIG. 4 is an architectural diagram of an OVP apparatus according to an embodiment of the present invention. Referring to FIG. 4, subsequent to the discussion of the previous embodiment, the reference voltage generator 71 receives the standby power VSB (e.g., 5V) and produces the reference voltage VREF (2V) by resistances 401 and 402 according to the principle of voltage division. The comparison unit 61 includes a diode 403, a comparator 404, a latch-up resistance 405, and a pull-up resistance 406. The pull-up resistance 406 is adapted to pull up the output voltage of the comparator 404 via the standby power VSB. The core power VCORE is received by the anode of the diode 403 and is outputted to a positive input terminal of the comparator 404 from the cathode of the diode 403, thus avoiding a back current. A negative input terminal of the comparator receives the reference voltage VREF. The two ends of the latch-up resistance 405 are coupled to the positive input terminal and an output terminal of the comparator 404, respectively, and thus the voltage of the output terminal of the comparator 404 is fed back to the positive input terminal of the comparator 404. The diode 403, the comparator 404, and the latch-up resistance 405 constitute a structure having a latch-up function.

In other words, suppose that the reference voltage VREF is initially higher than the core power VCORE, the comparator 404 outputs a logic low level, and therefore the power supply unit 41 keeps providing the system power VCC to the conversion unit 21. However, once the core power VCORE exceeds the reference voltage, the comparator 404 then outputs a logic high level, so that the power supply unit 41 stops providing the system power VCC to the conversion unit 21. The latch-up resistance 405 and the diode 403 latch the logic high level outputted by the comparator 404 at the positive input terminal of the comparator 404, so that the output of the comparator 404 can be maintained at the logic high level. As such, even though the core power VCORE drops and becomes lower than the reference voltage VREF when the system power VCC is disabled, the output of the comparator 404 is not changed from the logic high level to the logic low level. In such a way, the current embodiment of the present invention provides a solution to a conventional problem of the voltage oscillation of the core power VCORE causing damages to the load 31.

Figure 5:
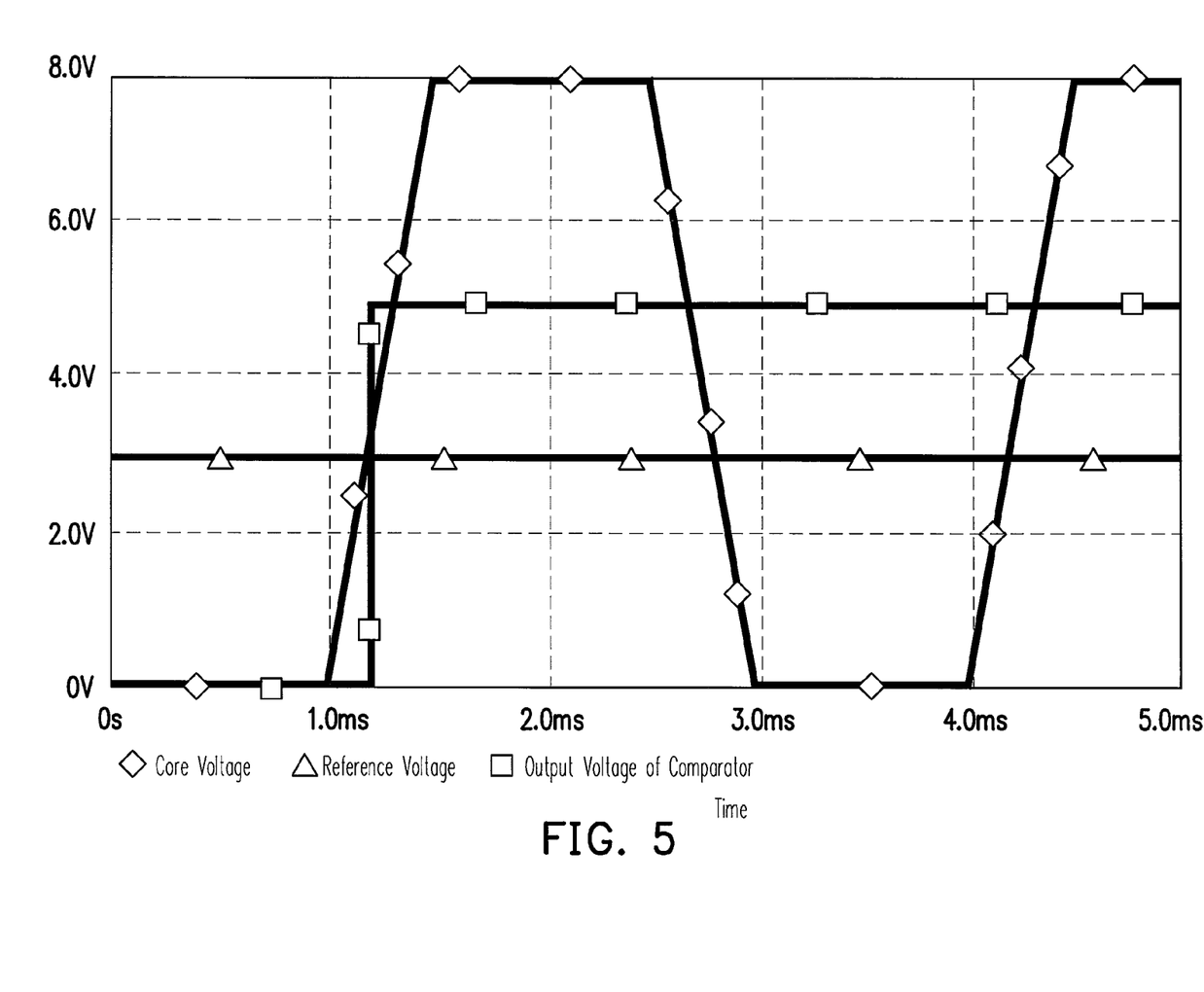
FIG. 5 is a timing sequence diagram illustrating different output voltages of a comparator obtained by simulation of the core power oscillation according to an embodiment of the present invention.

FIG. 5 is a timing sequence diagram illustrating different output voltages of the comparator 404 of FIG. 4 obtained by simulation of the core power oscillation according to an embodiment of the present invention. Referring to FIGS. 4 and 5 together, in the current embodiment, a core power VCORE which oscillates in accordance with the time is deliberately provided to the comparator 404. When the core power VCORE exceeds the reference voltage VREF, the output voltage of the comparator 404 varies from the logic low level (0V) to the logic high level (5V). As long as the core power VCORE drops and becomes lower than the reference voltage VREF again, the latch-up resistance 405 and the diode 403 perform the latch-up function to keep the output voltage of the comparator 404 to be at the logic high level.

Figure 6:
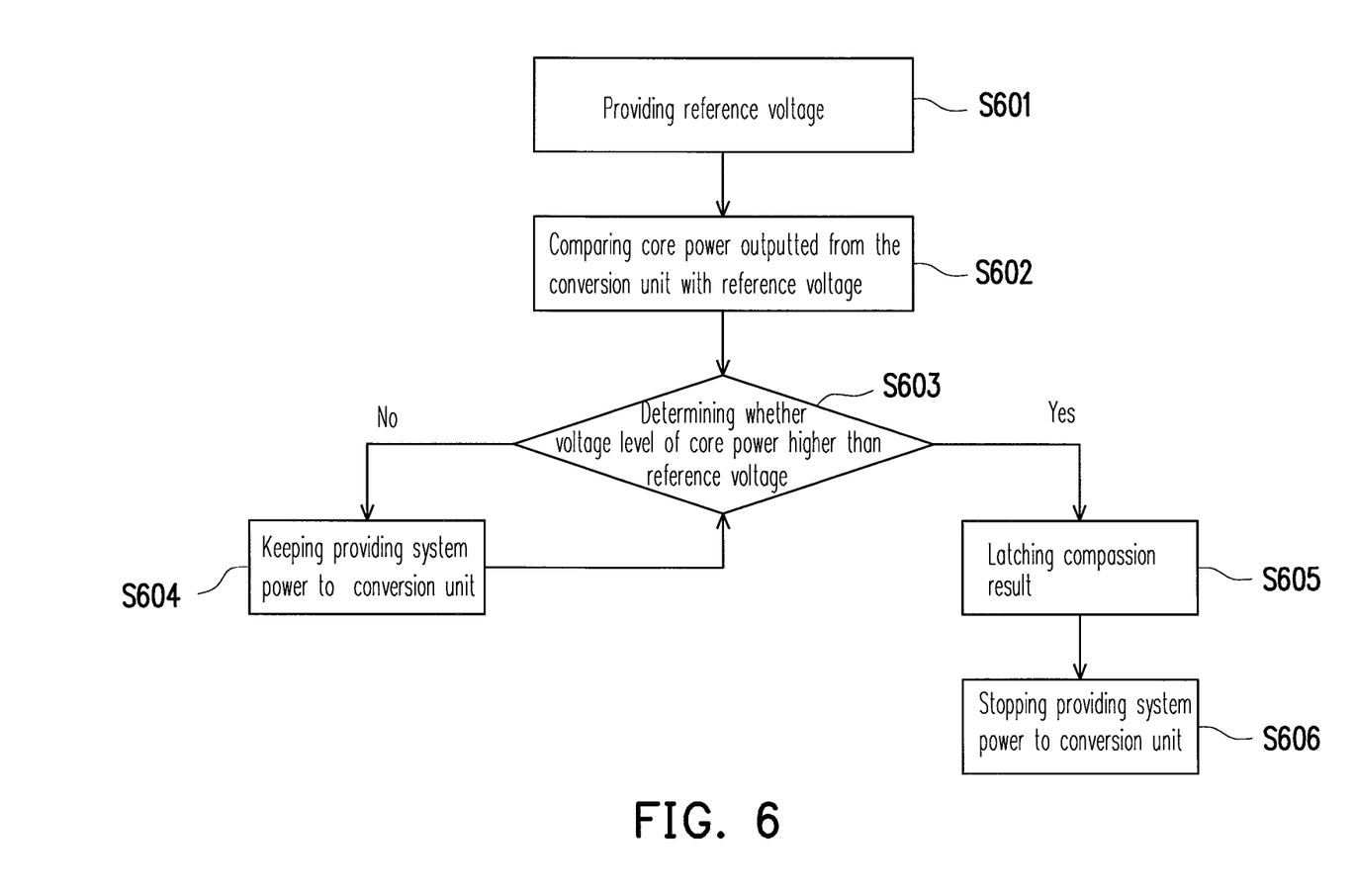
FIG. 6 is a flow chart illustrating an OVP method according to an embodiment of the present invention.

FIG. 6 is a flow chart illustrating an OVP method according to an embodiment of the present invention. Referring to FIGS. 3, 4, and 6 together, the current embodiment is illustrated based upon an assumption that initially the reference voltage VREF is 2V and the core power VCORE is 1.2V. First, in step S601, the reference voltage generator 71 provides the reference voltage VREF to the comparison unit 61 via an input terminal of the comparison unit 61. The other input terminal of the comparison unit 61 is connected with the core power VCORE outputted from the conversion unit 21.

Next, in step S602, a voltage level of the core power VCORE is compared with the reference voltage VREF. In step S603, it is determined whether the voltage level of the core power VCORE is higher than the reference voltage VREF. According to the assumption, it can be concluded that the voltage level of the core power (1.2V) is lower than the reference voltage (2V). As such, in step S604, the power supply unit 41 keeps providing the system power VCC to the conversion unit 21, and the flow returns back to step S603 for further monitoring the voltage level of the core power VCORE in comparison with the reference voltage VREF.

Furthermore, if, for example, a short circuit caused by failure of the upper power transistor 303 occurs, and the core power VCORE is pulled up and exceeds the reference voltage VREF, then the step S603 determines that the core power VCORE is higher than the reference voltage VREF. Therefore, the output voltage of the comparison unit 61 varies from the logic low level to the logic high level. In step S605, the comparison result (i.e., the logic high level) is latched in the comparison unit 61, so that the output voltage of the comparison unit 61 is not affected by the core power VCORE anymore. Since in this case the output voltage of the comparison unit 61 is at a logic high level, in step S606, the power supply unit 41 which is controlled by the OVP apparatus 11 stops providing the system power VCC to the conversion unit 21. Without the system power VCC, the conversion unit 21 is incapable of providing the core power VCORE to the load 31. Therefore, the present invention is adapted for preventing damages caused by over voltage to the load 31, and the capacitor does not explode because of the over voltage.

Figure 7:
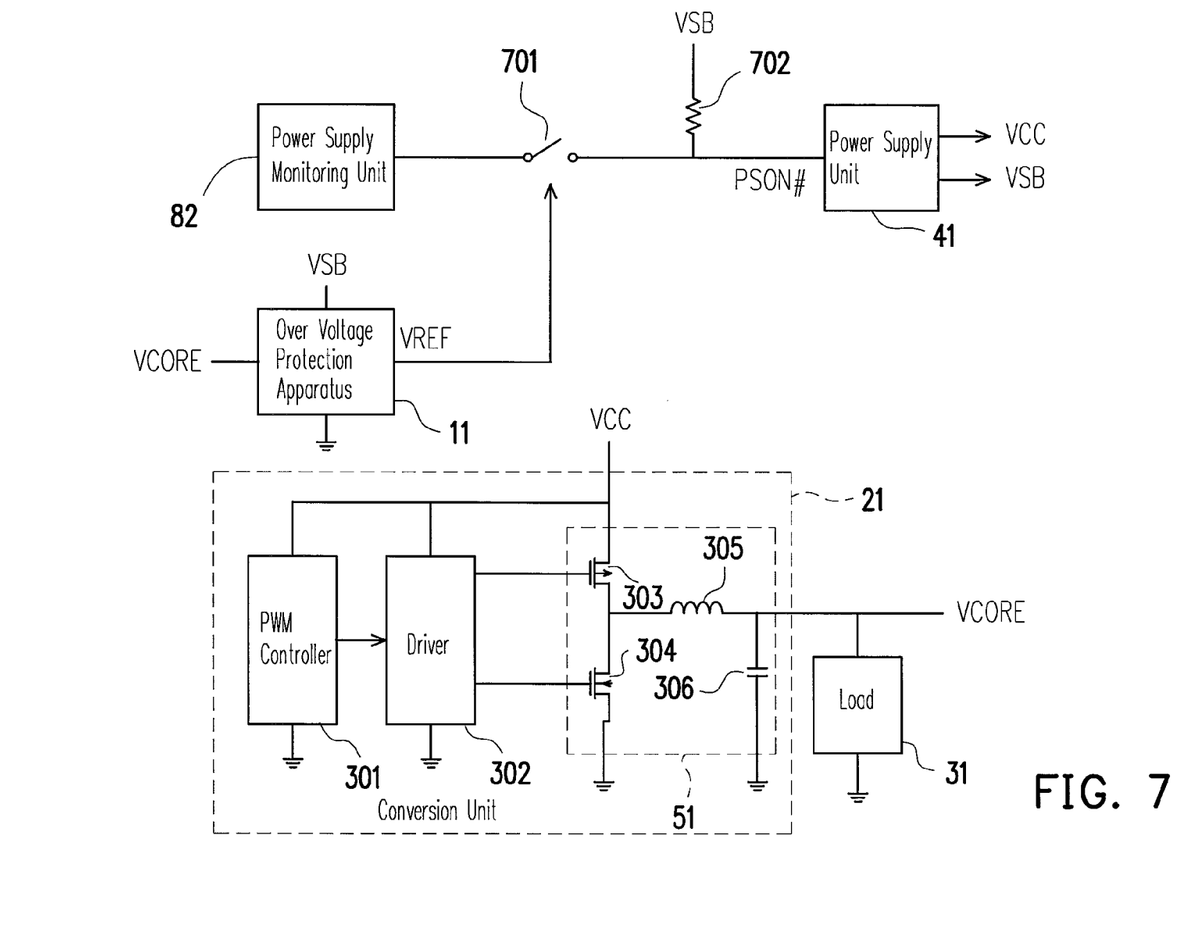
FIG. 7 illustrates another power supply according to an embodiment of the present invention.

Further, those skilled in the art may also be taught in accordance with the embodiments discussed above and the spirit of the present invention contained therein to apply the teachings to a power supply monitoring unit. For example, FIG. 7 illustrates another power supply according to an embodiment of the present invention. Referring to FIG. 7, the power supply unit 41, the conversion unit 21, the OVP apparatus 11, and the load 31 are same as those illustrated in the foregoing embodiments, and therefore are not further iterated herein. However, it should be noted that a power supply monitoring unit 82 is employed for monitoring operation statuses of the power supply, e.g., power output and rotating speed of a cooling fan, and for providing a control interface to shut off the power supply unit 41 when a user issues a power-off instruction. When the user issues a power-off instruction, the power supply monitoring unit 82 outputs a power supply enabling signal via a switch 701 to a power supply enabling terminal PSON# of the power supply unit 41 to determine whether to enable the power supply unit 41. When the power supply unit 41 is disabled, only the standby power VSB continues to be supplied. A pull-up resistance 702 pulls up the power supply enabling signal to a voltage high enough for driving the power supply unit 41 by the standby power VSB.

Further, the power supply unit 41 determines whether to provide the system power VCC to the conversion unit 21 according to the voltage level of the power supply enabling terminal PSON#. When the voltage level of the power supply enabling terminal PSON# is at a high level, the power supply unit 41 stops providing the system power VCC to the conversion unit 21. When the voltage level of the power supply enabling terminal PSON# is at a low level, the power supply unit 41 keeps providing the system power VCC to the conversion unit 21. It should be further noted that the switch 701 is usually continuously conducted by the OVP apparatus 11. When the OVP apparatus 11 detects that an over voltage occurs in the core power VCORE, the OVP apparatus 11 issues a control signal to turn off the switch 701 and configure an open circuit thereby. In this case, the voltage level of the power supply enabling terminal PSON# is pulled up by the pull-up resistance 702 to a high level, so that the power supply unit 41 stops providing the system power VCC to the conversion unit 21. In such a way, the present invention avoids damages caused by over voltages to the load 31 and the capacitor 306.

Figure 8:
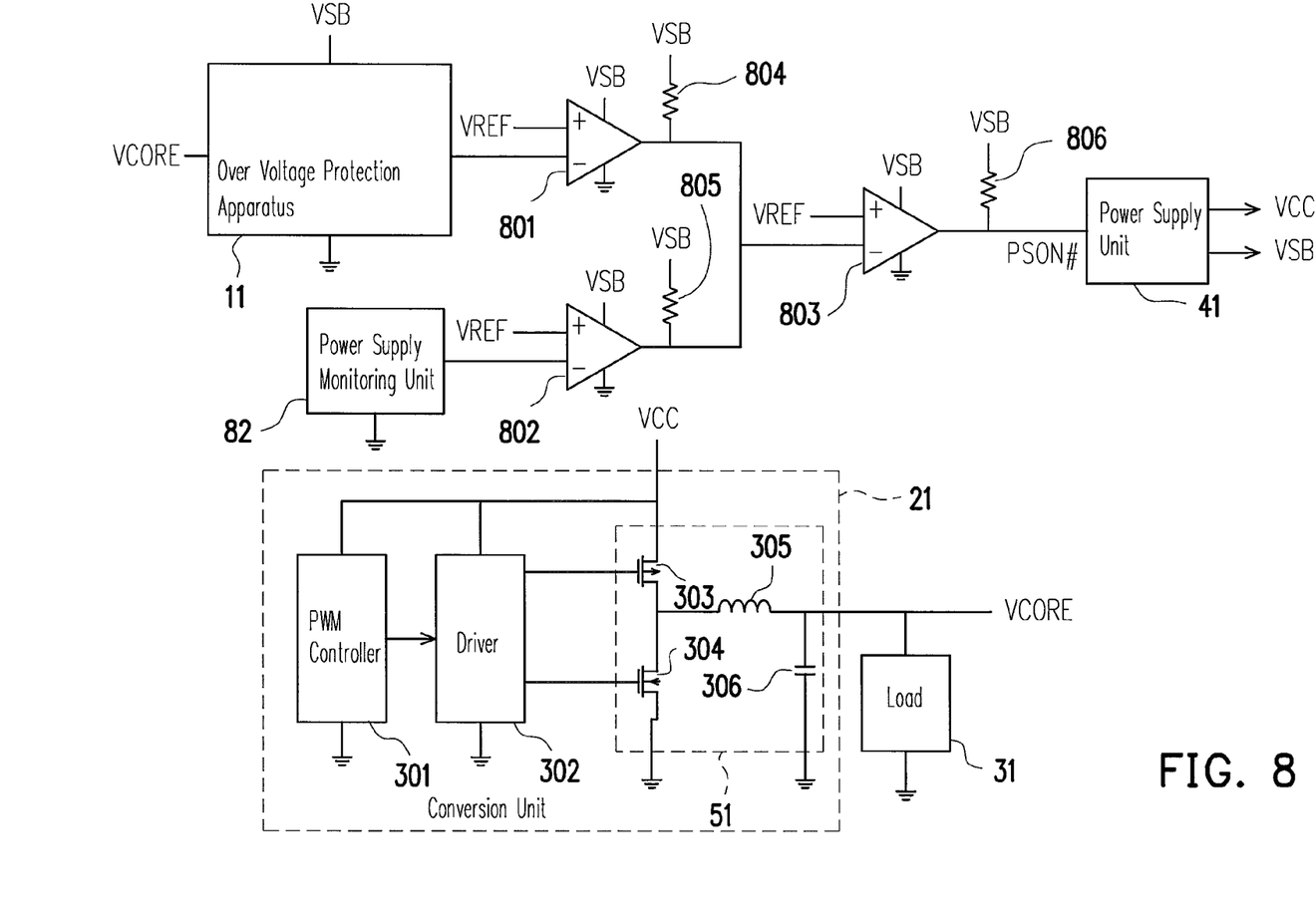
FIG. 8 illustrates still another power supply according to an embodiment of the present invention.

Further, those skilled in the art may also be taught in accordance with the embodiments discussed above and the spirit of the present invention contained therein to embody the switch 701 and the resistor 702 with use of alternative approaches. For example, FIG. 8 illustrates still another power supply according to an embodiment of the present invention. Referring to FIG. 8, the conversion unit 21, the load 31, the power supply unit 41, the OVP apparatus 11 and the power supply monitoring unit 82 are same as those described in the foregoing embodiment, and therefore are not further iterated herein. However, it should be noted that the difference between the current embodiment as shown in FIG. 8 and the foregoing rests in that the present embodiment further includes comparators 801 to 803 and pull-up resistances 804 to 806. Each of the comparators 801 to 803 includes a positive input terminal, a negative input terminal, and an output terminal. The positive input terminal of the comparator 801 receives the reference voltage VREF. When the negative input terminal of the comparator 801 receives a logic low level (lower than the reference voltage VREF), the output terminal of the comparator 801 outputs a logic high level, and when the negative input terminal of the comparator 801 receives a logic high level (higher than the reference voltage VREF), the output terminal of the comparator 801 outputs a logic low level. The operations of the comparators 802 and 803 are similar to the operations of the comparator 801, and thus are not further iterated herein. The resistances 804 to 806 are operated by means of the standby power VSB for improving the output driving capability of the comparators 801 to 803.

The negative input terminals of the comparators 801 and 802 are normally at the logic low level, and therefore the output terminals of the comparators 801 and 802 are normally at the logic high level. As such, the output terminal of the comparator 803 is normally at the logic low level. After receiving the logic low level outputted from the comparator 803, the power supply enabling terminal PSON# of the power supply unit 41 keeps providing the system power VCC.

When the OVP apparatus 11 detects that an over voltage occurs at the core power VCORE, the OVP apparatus 11 issues a logic high level to the comparator 801. As such, the comparator 801 outputs a logic low level, so that the comparator 803 outputs a logic high level to the power supply unit 41. Because the power supply enabling terminal PSON# of the power supply unit 41 receives a logic high level, the power supply unit 41 stops providing the system power VCC to the conversion unit 21. Therefore, the conversion unit 21 that is not supplied with the system power VCC stops operating. In such a way, the present invention achieves the function of over voltage protection.

On the other hand, under a normal operation condition, the power supply monitoring unit 82 keeps outputting logic low level to the comparator 802. When the user issues a turn-off instruction, the power supply monitoring unit 82 outputs a logic high level to the comparator 802, which causes the comparator 802 to output a logic low level. The logic low level outputted from the comparator 802 causes the comparator 803 to output a logic high level to the power supply enabling terminal PSON# of the power supply unit 41. Because the power supply enabling terminal PSON# of the power supply unit 41 receives the logic high level, the power supply unit 41 is disabled (only the standby power VSB continues to be provided), thus turning off the whole system.

Generally, the comparators 801 to 803 are equivalent OR gates, so that both of the OVP apparatus 11 and the power supply monitoring unit 82 can determines whether to provide the system power VCC to the power supply unit 41 or not. In such a way, the present invention not only achieves the over voltage protection function, but also keeps performing the function of the power supply monitoring unit 82, i.e. determining whether to stop providing the system power VCC to the power supply unit 41.

Figure 9:
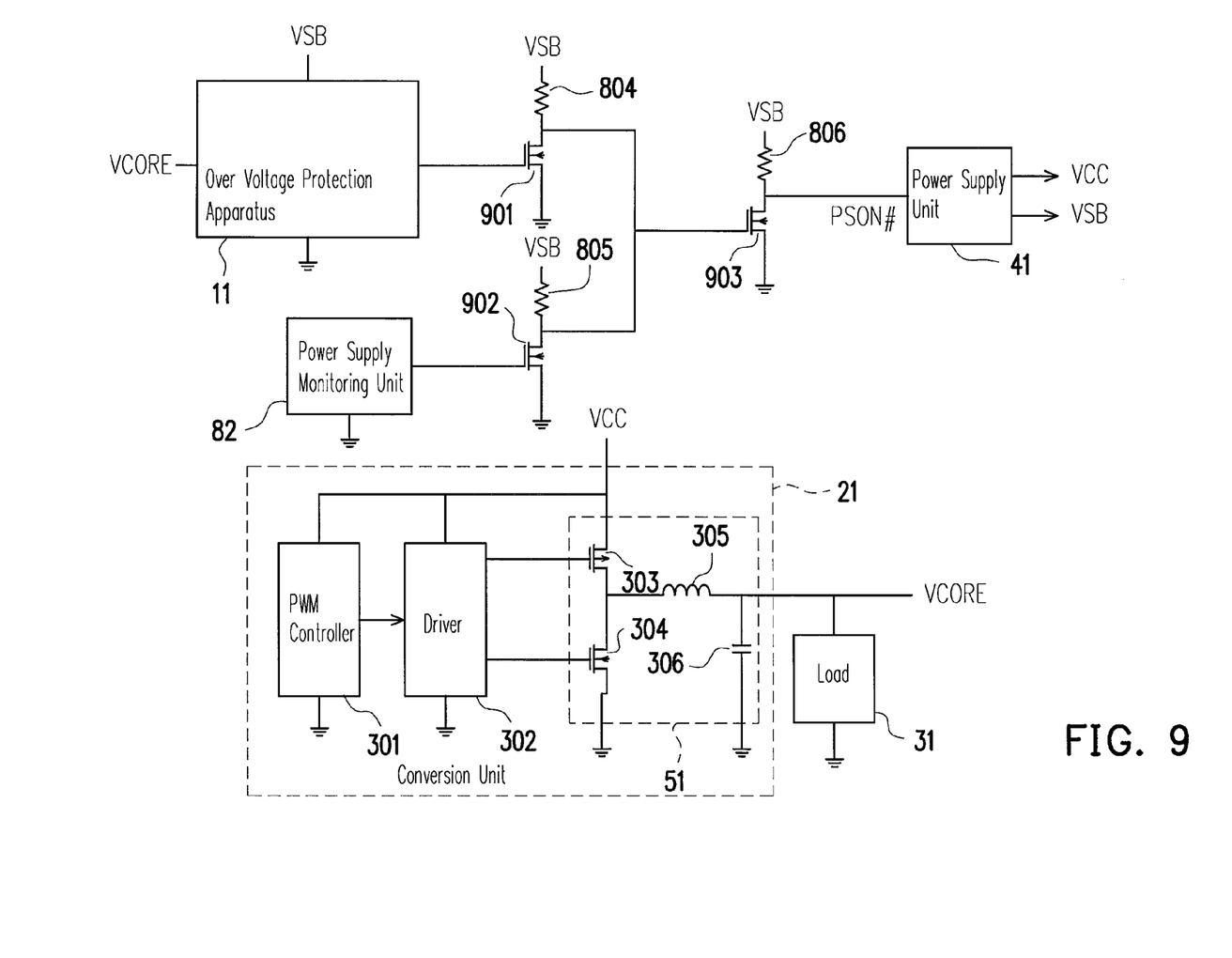
FIG. 9 illustrates yet still another power supply according to an embodiment of the present invention.

Those skilled in the art should also be able to modify the embodiments of the present invention as discussed above as desired by replacing the comparators as shown in FIG. 8 with transistors as shown in FIG. 9. FIG. 9 illustrates yet still another power supply according to an embodiment of the present invention. Referring to FIG. 9, the conversion unit 21, the load 31, the power supply unit 41, the OVP apparatus 11, the power supply monitoring unit 82, and the resistances 804 to 806 of FIG. 9 are similar to corresponding elements of the foregoing embodiment, and thus are not further iterated herein. However, it should be noted that the difference between the current embodiment as shown in FIG. 9 and the embodiment as shown in FIG. 8 rests in that the current embodiment employs N type metal oxide semiconductor (NMOS) transistors 901 to 903 instead of the comparators 801 to 803 of FIG. 8. The NMOS transistors 901 to 903 serve as switches in the current embodiment. In other words, when a gate of any of the NMOS transistors 901 to 903 receives a logic low level, the corresponding NMOS transistor is turned off to be in a cutting-off status. Correspondingly, when a gate of any of the NMOS transistors 901 to 903 receives a logic high level, the corresponding NMOS transistor is cut off to be in a conducting status.

Further, when the system is normally operated, the OVP apparatus 11 and the power supply monitoring unit 82 output logic low levels to a gate of the NMOS transistor 901 and a gate of the NMOS transistor 902, respectively, so as to cut off the NMOS transistors 901 and 902. Meanwhile, via the pull-up resistances 804 and 805, the standby power VSB provides a logic high level to a gate of the NMOS transistor 903 to get it conducted. The power supply enabling terminal PSON# receives the logic low level, and thus the power supply unit 41 keeps providing the system power VCC.

When an over voltage occurs in the core power VCORE outputted from the conversion unit 21, the OVP apparatus 11 outputs a logic high level to the gate of the NMOS transistor 901, such that the NMOS transistor 901 is conducted. Therefore, the gate of the NMOS transistor 903 is grounded via the NMOS transistor 901, so that the NMOS transistor 903 is cut off. In this case, the standby power VSB provides a logic high level to the power supply enabling terminal PSON# via the pull-up resistance 806, so that the power supply unit 41 stops providing the system power VCC.

For similar reasons, when the user issues a turn-off instruction, the power supply monitoring unit 82 outputs a logic high level to the gate of the NMOS transistor 902. Therefore, the standby power VSB provides a logic high level to the power supply enabling terminal PSON# via the pull-up resistance 806, so that the power supply unit 41 stops providing the system power VCC, thus turning off the whole system. In other words, either one of the OVP apparatus 11 and the power supply monitoring unit 82 is capable of stopping providing the system power VCC. As such, the OVP apparatus 11 is not only adapted for providing over voltage protection but also adapted for independently controlling the power supply unit 41 without being interfered with the power supply monitoring unit 82. Of course, those skilled in the art may also modify the present invention by disposing the OVP apparatus 11 inside the power supply monitoring unit 82 for saving cost, which can be well understood by those skilled in the art and are not further iterated herein.

In summary, the aforementioned embodiments of the present invention have at least the following advantages.

1. An OVP apparatus is used to monitor the core power VCORE, so as to avoid damages caused by abnormal boost of the core power VCORE to the capacitor (which may cause leakage of capacitor fluid) of the conversion unit.

2. When the core power VCORE abnormally boosts, the power supply unit stops providing the system power VCC to the conversion unit, thus avoiding the damages caused by the over voltage to the load.

3. The lower power transistor of the conversion unit is not required to be maintained in a normally open status, so that the when the power supply unit stops providing the system power VCC to the conversion unit, the load is not damaged.

4. When an over voltage is detected, the OVP apparatus determines whether to stop providing the system power VCC to the power supply unit and determines the power supply unit not to provide the system power VCC any more by the latch-up resistance, thus avoiding damages caused by voltage oscillation to the capacitor of the conversion unit or the load.

5. The comparators or the transistors are employed for allowing the OVP apparatus and the power supply monitoring unit to control the power supplying unit together, and therefore the OVP apparatus is not only adapted for providing over voltage protection but also adapted for co-controlling the power supply unit together with the power supply monitoring unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply, comprising:
a power supply unit, adapted for providing powers of different voltage levels, the powers comprising a standby power and a system power, wherein when the power supply unit is disabled, the power supply unit keeps providing the standby power but stops providing the system power;
a conversion unit, adapted for converting the system power outputted from the power supply unit into a core power so as to provide the core power to a load; and
an over voltage protection (OVP) apparatus, coupled to the power supply unit for receiving the standby power and coupled to the conversion unit for monitoring a voltage level of the core power, wherein, when the voltage level of the core power is less than a reference voltage, the power supply providing the system power to the power conversion unit, wherein when the voltage level of the core power is higher than the reference voltage, the OVP apparatus directly output a disable signal to the power supply unit to disable the power supply unit and stop the system power providing to the conversion unit.

2. The power supply according to claim 1, wherein a voltage level of the system power is higher than the voltage level of the core power.

3. The power supply according to claim 1, wherein the conversion unit comprises:

a buck circuit, adapted for converting the system power into the core power;
a driver, for driving the buck circuit; and
a pulse width modulation (PWM) controller, adapted for modulating a pulse width of a PWM signal according to the voltage level of the core power, and outputting the PWM signal to the driver to control the voltage level of the core power outputted from the buck circuit via the driver.

4. The power supply according to claim 3, wherein the buck circuit comprises:
an upper power transistor, having a gate coupled to the driver, a source coupled to the system power, and a drain;
a lower power transistor, having a gate coupled to the driver, a source coupled to a ground, and a drain coupled to the drain of the upper power transistor;
an inductance, having a first end coupled to the drain of the upper power transistor and a second end outputting the core power; and
a load capacitance, having a first end coupled to the second end of the inductance and a second end coupled to the ground.

5. The power supply according to claim 1, wherein the OVP apparatus comprises:
a reference voltage generator, for generating the reference voltage according to the standby power; and
a comparison unit, adapted for receiving the reference voltage and the core power and comparing the reference voltage with the core power, wherein the OVP apparatus controls whether to disable the power supply unit according to a comparison result of comparing the reference voltage with the core power.

6. The power supply according to claim 5, wherein the reference voltage generator comprises:
a first resistive voltage divider, having a first end receiving the standby power and a second end, wherein a voltage of the second end serves as the reference voltage; and
a second resistive voltage divider, having a first end coupled to the second end of the first resistive voltage divider and a second end coupled to the ground.

7. The power supply according to claim 5, wherein the comparison unit comprises:
a diode, having an anode receiving the core power;
a comparator, having a positive input terminal coupled to a cathode of the diode, a negative input terminal receiving the reference voltage, and an output terminal providing the comparison result of comparing the reference voltage with the core power;
a latch-up resistance, having two ends coupled to the positive input terminal and the output terminal of the comparator, respectively; and
a pull-up resistance, having a first end receiving the standby power, and a second end coupled to the output terminal of the comparator.

8. The power supply according to claim 1, further comprising:
a switch, having a first end receiving a power supply enabling signal and a second end coupled to the power supply unit for determining a conducting status of the switch according to a control of the OVP apparatus;
a power supply monitoring unit, adapted for monitoring a power output of the power supply and outputting the power supply enabling signal via the switch for controlling whether to enable the power supply unit; and
a second pull-up resistance, having a first end receiving the standby power and a second end coupled to the second end of the switch.

9. The power supply according to claim 1, further comprising:
a power supply monitoring unit, for monitoring a power output of the power supply and outputting a power supply enabling signal, wherein the power supply enabling signal determines whether to enable the power supply unit;
a second comparator, having a positive input terminal receiving the reference voltage, a negative input terminal receiving the power supply enabling signal, and an output terminal;
a third comparator, having a positive input terminal receiving the reference voltage, a negative input terminal coupled to the OVP apparatus, and an output terminal;
a fourth comparator, having a positive input terminal receiving the reference voltage, a negative input terminal coupled to the output terminals of the second comparator and the third comparator, and an output terminal, wherein whether to enable the power supply unit is determined according to an output of the fourth comparator;
a third pull-up resistance, having a first end receiving the standby power and a second end coupled to the output terminal of the second comparator;
a fourth pull-up resistance, having a first end receiving the standby power and a second end coupled to the output terminal of the third comparator; and
a fifth pull-up resistance, having a first end receiving the standby power and a second end coupled to the output terminal of the fourth comparator.

10. The power supply according to claim 1, further comprising:
a power supply monitoring unit, for monitoring a power output of the power supply and outputting a power supply enabling signal, wherein the power supply enabling signal determines whether to enable the power supply unit;
a first transistor, having a gate receiving the power supply enabling signal, a source coupled to a ground, and a drain;
a first impedance, having a first end receiving the standby power and a second end coupled to the drain of the first transistor;
a second transistor, having a gate coupled to the OVP apparatus, a source coupled to the ground, and a drain;
a second impedance, having a first end receiving the standby power and a second end coupled to the drain of the second transistor;
a third transistor, having a gate coupled to the drains of the first transistor and the second transistor, a source coupled to the ground, and a drain, wherein whether to enable the power supply unit is determined according to a level of the drain of the third transistor; and
a third impedance, having a first end receiving the standby power and a second end coupled to the drain of the third transistor.

11. An OVP apparatus for monitoring whether a voltage level of a core power outputted from a conversion unit is higher than a reference voltage, the OVP apparatus comprising:
a reference voltage generator, adapted for generating a reference voltage according to a standby power; and
a comparison unit, adapted for receiving the reference voltage and the core power and comparing the reference voltage with the core power, wherein the OVP apparatus determines whether to provide a system power to the conversion unit according to a comparison result of the comparison unit comparing the reference voltage with the core power.

12. The OVP apparatus according to claim 11, wherein the reference voltage generator comprises:
   a first resistive voltage divider, having a first end receiving the standby power and a second end, wherein a voltage of the second serves as the reference voltage; and
   a second resistive voltage divider, having a first end coupled to the second end of the first resistive voltage divider and a second end coupled to a ground.

13. The OVP apparatus according to claim 11, wherein the comparison unit comprises:
   a diode, having an anode receiving the core power and a cathode;
   a comparator, having a positive input terminal coupled to the cathode of the diode, a negative input terminal receiving the reference voltage, an output terminal providing the comparison result of the comparison unit;
   a latch-up resistance, having two ends coupled to the positive input terminal and the output terminal of the comparator, respectively; and
   a pull-up resistance, having a first end receiving the standby power and a second end coupled to the output terminal of the comparator.

14. A power supply, comprising:
   a power supply unit, adapted for providing powers of different voltage levels, the powers comprising a standby power and a system power, wherein when the power supply unit is disabled, the power supply unit keeps providing the standby power but stops providing the system power;
   a conversion unit, adapted for converting the system power outputted from the power supply unit into a core power so as to provide the core power to a load; and
   an over voltage protection (OVP) apparatus, coupled to the power supply unit for receiving the standby power and coupled to the conversion unit for monitoring a voltage level of the core power, the OVP apparatus having a reference voltage generator, a comparison unit and a comparison unit, the reference voltage generator generating a reference voltage to the comparison unit, the comparison unit adapted for receiving the reference voltage and the core power and comparing the reference voltage with the core power, when the voltage level of the core power is higher than the reference voltage, the OVP apparatus directly output a disable signal to the power supply unit to disable the power supply unit and stop the system power providing to the conversion unit.

15. The power supply according to claim 14, the OVP apparatus generates the reference voltage by dividing a voltage level of the standby power.

16. The power supply according to claim 14, wherein the OVP apparatus comprises:
   a reference voltage generator, for generating the reference voltage according to the standby power; and
   a comparison unit, adapted for receiving the reference voltage and the core power and comparing the reference voltage with the core power, wherein the OVP apparatus controls whether to disable the power supply unit according to a comparison result of comparing the reference voltage with the core power.

17. The power supply according to claim 16, wherein the reference voltage generator comprises:
   a first resistive voltage divider, having a first end receiving the standby power and a second end, wherein a voltage of the second end serves as the reference voltage; and
   a second resistive voltage divider, having a first end coupled to the second end of the first resistive voltage divider and a second end coupled to the ground.

18. The power supply according to claim 16, wherein the comparison unit comprises:
   a diode, having an anode receiving the core power;
   a comparator, having a positive input terminal coupled to a cathode of the diode, a negative input terminal receiving the reference voltage, and an output terminal providing the comparison result of comparing the reference voltage with the core power;
   a latch-up resistance, having two ends coupled to the positive input terminal and the output terminal of the comparator, respectively; and
   a pull-up resistance, having a first end receiving the standby power, and a second end coupled to the output terminal of the comparator.

* * * * *